(12) United States Patent
Nill (10) Patent No.: US 11,473,306 B2
(45) Date of Patent: Oct. 18, 2022

(54) ANCHOR PLATFORM ASSEMBLY

(71) Applicant: Lance Nill, Southampton, NY (US)

(72) Inventor: Lance Nill, Southampton, NY (US)

(73) Assignee: LN1 INC, Southampton, NY (US)

( * ) Notice: Subject to any disclaimer, the term of this patent is extended or adjusted under 35 U.S.C. 154(b) by 0 days.

(21) Appl. No.: 16/677,236

(22) Filed: Nov. 7, 2019

(65) Prior Publication Data

US 2020/0087918 A1 Mar. 19, 2020

Related U.S. Application Data (63) Continuation of application No. 15/852,733, filed on Dec. 22, 2017, now Pat. No. 10,501,939.

(51) Int. Cl.
*E04D 13/00* (2006.01)
*F16B 9/02* (2006.01)
*E04F 11/18* (2006.01)

(52) U.S. Cl.
CPC ............... *E04D 13/00* (2013.01); *F16B 9/02* (2013.01); *E04F 11/1812* (2013.01); *E04F 11/1853* (2013.01)

(58) Field of Classification Search
CPC ...... F16B 37/122; F16B 37/125; F16B 9/026; E04F 11/1853; E04F 11/1812; E04D 13/00
USPC ................................................. 52/169.8, 296
See application file for complete search history.

(56) References Cited

U.S. PATENT DOCUMENTS

| | | | |
|---|---|---|---|
| 827,613 A * | 7/1906 | Name not available | E04B 1/4107 52/707 |
| 2,227,713 A * | 1/1941 | Higgins | E04B 5/12 52/365 |
| 2,377,397 A | 6/1945 | Booth | |
| 2,595,506 A | 5/1952 | Backman | |

(Continued)

FOREIGN PATENT DOCUMENTS

| | | |
|---|---|---|
| CA | 2746029 | 1/2012 |
| CH | 677011 A5 | 3/1991 |

(Continued)

OTHER PUBLICATIONS

Supplemental Information Disclosure Statement No. 2 by Applicant, U.S. Appl. No. 15/852,733, Title: Anchor Platform Assembly, Applicant—Lance Nill.

(Continued)

*Primary Examiner* — Brian E Glessner
*Assistant Examiner* — Adam G Barlow
(74) *Attorney, Agent, or Firm* — Galgano IP Law PLLC; Thomas M. Galgano, Esq.

(57) ABSTRACT

An anchor platform assembly for anchoring an object to a raised, generally flat roof-like structure, has an anchor baseplate having a top surface and a bottom surface, and an internally threaded blindbore extending at least partially from the top surface generally towards the bottom surface and fasteners for fastening an object to the anchor baseplate via its blindbore, and for fastening the anchor baseplate to a top surface of a roof-like structure. The assembly is especially intended for supporting, e.g., glass railings on balconies, terraces and flat roofs and for mounted solar panels on both flat and pitched roofs which provides strength and affords watertight performance.

15 Claims, 10 Drawing Sheets

(56) References Cited

U.S. PATENT DOCUMENTS

| | | | | |
|---|---|---|---|---|
| 2,881,016 | A | * | 4/1959 | Wagner ............... E04F 11/1812 403/24 |
| 3,245,181 | A | | 4/1966 | Stephenson |
| 3,284,973 | A | * | 11/1966 | Ames ...................... E01C 23/01 52/155 |
| 3,323,765 | A | * | 6/1967 | Fernandez ............ E04H 12/003 52/295 |
| 3,456,412 | A | | 7/1969 | Decombas |
| 3,603,622 | A | * | 9/1971 | March ...................... E04D 3/36 52/92.2 |
| 3,715,850 | A | | 2/1973 | Chambers |
| 3,749,424 | A | | 7/1973 | Greene |
| 3,868,732 | A | | 3/1975 | Engelhart |
| 3,967,906 | A | * | 7/1976 | Strizki ................... E01F 9/635 403/2 |
| 4,363,467 | A | * | 12/1982 | Bos ...................... E04F 11/181 248/158 |
| 4,371,139 | A | | 2/1983 | Clark |
| 4,490,083 | A | | 12/1984 | Rebish |
| 4,581,863 | A | * | 4/1986 | Thaler ................ E04D 13/1407 248/354.3 |
| 4,614,070 | A | * | 9/1986 | Idland ................. E04H 12/2253 52/296 |
| 4,658,948 | A | | 4/1987 | Adrian |
| 4,658,946 | A | | 6/1987 | Adrian et al. |
| 4,749,318 | A | * | 6/1988 | Bredal .................. F16B 37/122 411/180 |
| 4,750,306 | A | | 6/1988 | Granieri |
| 5,085,547 | A | | 2/1992 | Vanotti |
| 5,309,688 | A | | 5/1994 | Robertson |
| 5,375,384 | A | * | 12/1994 | Wolfson ................ E04B 1/0007 52/295 |
| 5,596,845 | A | * | 1/1997 | Strizki ................... E01F 9/635 403/13 |
| 5,603,187 | A | * | 2/1997 | Merrin .................... E04D 13/12 52/58 |
| 6,015,138 | A | * | 1/2000 | Kohlberger ......... E04F 11/1812 256/65.14 |
| 6,141,928 | A | | 11/2000 | Platt |
| 6,202,371 | B1 | * | 3/2001 | Natelli, Jr. ................ E04C 3/29 52/170 |
| 6,213,701 | B1 | * | 4/2001 | Ukai .................. F16B 13/0833 411/340 |
| 6,290,212 | B1 | | 9/2001 | Bartel |
| 6,295,773 | B1 | | 10/2001 | Alty |
| 6,336,620 | B1 | * | 1/2002 | Belli .................... E04F 11/1814 248/519 |
| 6,361,258 | B1 | | 3/2002 | Heesch |
| 6,439,817 | B1 | | 8/2002 | Reed |
| 6,516,741 | B1 | * | 2/2003 | Sorum ...................... F16B 9/02 116/137 R |
| 6,557,912 | B1 | | 5/2003 | Truong |
| 6,568,145 | B2 | * | 5/2003 | Bartel .................. E04F 11/181 256/59 |
| 7,475,479 | B1 | * | 1/2009 | Ross ................... E04F 11/1812 29/525.01 |
| 8,424,255 | B2 | * | 4/2013 | Lenox ................. F24S 25/634 52/173.3 |
| 8,448,405 | B2 | * | 5/2013 | Schaefer ................ F24S 25/61 52/710 |
| 8,453,416 | B2 | * | 6/2013 | Brindle ................. E04C 3/005 52/854 |
| 8,479,455 | B2 | * | 7/2013 | Schaefer ............ E04D 13/1476 52/58 |
| 8,752,338 | B2 | * | 6/2014 | Schaefer ................ F24S 25/70 52/60 |
| 8,833,031 | B2 | * | 9/2014 | Steffen ................. H02S 20/24 52/704 |
| 8,833,033 | B2 | | 9/2014 | Schaefer et al. |
| 8,959,857 | B1 | * | 2/2015 | Lin ................... E04H 12/2261 52/296 |
| 9,097,017 | B1 | | 8/2015 | Nep |
| 9,103,112 | B2 | * | 8/2015 | Corsi .................. F24S 25/615 |
| 9,165,488 | B1 | | 10/2015 | Johnson |
| 9,194,130 | B1 | * | 11/2015 | Stanley .................. F24S 25/40 |
| 9,347,232 | B1 | | 5/2016 | Francies, III |
| 9,464,397 | B1 | | 10/2016 | Abraham |
| 9,712,106 | B2 | * | 7/2017 | Wentworth ............. F24S 25/33 |
| D805,223 | S | * | 12/2017 | DeBellis ...................... D25/199 |
| 9,976,298 | B2 | * | 5/2018 | Bergman ............ E04F 11/1812 |
| D908,196 | S | * | 1/2021 | Tropper ...................... D23/262 |
| 2001/0009087 | A1 | | 7/2001 | Valentz et al. |
| 2003/0221385 | A1 | | 12/2003 | Platt |
| 2005/0053449 | A1 | * | 3/2005 | Grubert ................. F16B 37/067 411/546 |
| 2005/0115158 | A1 | * | 6/2005 | Brown .................. E04D 13/064 52/11 |
| 2005/0252124 | A1 | | 11/2005 | Bergman |
| 2006/0230694 | A1 | * | 10/2006 | Skov ...................... E04D 13/03 52/200 |
| 2008/0240883 | A1 | | 10/2008 | Walling |
| 2009/0293417 | A1 | | 12/2009 | Ren et al. |
| 2010/0109318 | A1 | * | 5/2010 | Mulligan ............ E04D 13/0409 285/42 |
| 2010/0247270 | A1 | | 9/2010 | Cao |
| 2010/0281791 | A1 | * | 11/2010 | Intagliata ............ G09F 15/0037 52/127.12 |
| 2011/0158766 | A1 | | 6/2011 | Mitrovic |
| 2012/0090263 | A1 | * | 4/2012 | Schaefer ............ E04D 13/1476 52/741.4 |
| 2012/0144760 | A1 | * | 6/2012 | Schaefer ............ E04D 13/0404 52/58 |
| 2012/0183373 | A1 | | 7/2012 | Harvey |
| 2012/0222380 | A1 | | 9/2012 | Wentworth et al. |
| 2013/0000243 | A1 | * | 1/2013 | Steffen ................... F24S 25/61 52/705 |
| 2013/0008102 | A1 | * | 1/2013 | Bindschedler ........ E04D 11/007 52/173.3 |
| 2013/0108392 | A1 | * | 5/2013 | Henriksen, Jr. ....... F16B 33/002 411/166 |
| 2013/0145704 | A1 | * | 6/2013 | Stein, Jr. ................... E06B 1/02 52/204.1 |
| 2013/0272816 | A1 | | 10/2013 | Vilas |
| 2013/0291479 | A1 | * | 11/2013 | Schaefer ................ H02S 20/23 52/745.21 |
| 2013/0292531 | A1 | * | 11/2013 | Schaefer ................ E04D 13/00 248/237 |
| 2014/0007532 | A1 | * | 1/2014 | Schaefer ................ F24S 25/70 52/302.6 |
| 2014/0008506 | A1 | * | 1/2014 | Schaefer ............. H01Q 1/1221 248/237 |
| 2014/0101913 | A1 | | 4/2014 | Roddenberry |
| 2014/0138596 | A1 | | 5/2014 | Ross |
| 2014/0174554 | A1 | * | 6/2014 | Meyberg .................. F16K 5/08 137/15.18 |
| 2014/0208664 | A1 | * | 7/2014 | Schaefer ................ F24S 25/20 52/58 |
| 2014/0208680 | A1 | * | 7/2014 | Schaefer ................... E04B 1/66 52/705 |
| 2014/0252292 | A1 | * | 9/2014 | Clarke ................ E04H 17/1413 256/65.14 |
| 2015/0121797 | A1 | | 5/2015 | Brown et al. |
| 2015/0184406 | A1 | * | 7/2015 | Naylor ................ E04G 23/0203 52/514 |
| 2015/0218824 | A1 | * | 8/2015 | Schaefer ................ F16B 9/056 52/704 |
| 2016/0017594 | A1 | | 1/2016 | Drummond et al. |
| 2016/0145873 | A1 | * | 5/2016 | Green .................. E04F 11/1812 52/832 |
| 2017/0175384 | A1 | * | 6/2017 | Bergman ............ E04F 11/1812 |
| 2018/0073241 | A1 | | 3/2018 | Lomax |
| 2020/0096036 | A1 | * | 3/2020 | Stumpf ............... B29C 65/1435 |

FOREIGN PATENT DOCUMENTS

| | | |
|---|---|---|
| CN | 101198797 A | 6/2008 |
| CN | 102076977 A | 5/2011 |
| CN | 103047239 A | 4/2013 |
| CN | 205478807 U | 8/2016 |
| DE | 4041765 A1 | 6/1992 |

(56) References Cited

FOREIGN PATENT DOCUMENTS

| DE | 102008012717 A1 | 9/2009 |
|---|---|---|
| DE | 102011116877 A1 | 4/2013 |
| DE | 102011117629 A1 | 5/2013 |
| EP | 0641889 | 3/1995 |
| EP | 0916788 A1 | 5/1999 |
| EP | 0926362 A1 | 6/1999 |
| EP | 2584121 A2 | 4/2013 |
| EP | 3034893 A1 | 6/2016 |
| FR | 2250368 A5 | 5/1975 |
| GB | 2422854 A | 8/2006 |
| WO | 9010133 A | 9/1990 |
| WO | 2015044534 A1 | 4/2015 |

OTHER PUBLICATIONS

Supplemental Information Disclosure Statement No. 3 by Applicant, U.S. Appl. No. 15/852,733, Title: Anchor Platform Assembly, Applicant—Lance Nill.
European Search Report dated Jul. 27, 2021 Reference MJL/SH/47398EP1 Application No./Patent No. 18892798.2-1002/3707821 PCT/US2018065465 Appiicant/Proprietor: Nill, Lance.

* cited by examiner

ANCHOR PLATFORM ASSEMBLY

RELATED APPLICATION

This application is a continuation of U.S. patent application Ser. No. 15/852,733, filed Dec. 22, 2017.

BACKGROUND OF THE INVENTION

1. Field of the Invention

An anchor platform assembly for anchoring roof accessory structures to roofs and other raised, flat and pitched structures, terraces, balconies and the like, e.g., railings and solar panels, while providing both strength and watertight performance.

2. Brief Description of the Prior Art

Various methods for mounting and waterproofing roof equipment, accessory structures or the like, which are attached to sloped or flat roofs, building terraces, roof decks, etc. are well known. In the roofing industry, there are many problems with water infiltration at equipment attachment points, particularly when flashing is not incorporated and/or sealants are solely relied on. A variety of sheathing methods and combinations thereof are used as a water and moisture barrier on such structures such as asphalt roof tiles, poured or sheeted plastic or rubber membranes and the like. Currently, more and more roof heavy roof structures are being mounted on roofs such as, e.g., solar panels, satellite dishes, HVAC equipment, and especially for roof decks, balconies, terraces and the like, glass walls and/or railings are being mounted to avoid viewing obstructions such as would normally be the case with a wooden, cable or metal fence. These generally heavy structures must also be anchored to the roof structures, but because of the loads they generate and the manner in which they are mounted, typically with anchors bolted through the roof, they create a "conduit" for water to penetrate through the roof, notwithstanding the fact that the adhesive and glue are often used to seal the conduit in an attempt to prevent such water penetration. In fact, over time, these heavy structures as a result of normal repetitive roof movement or shifting caused by, e.g., settling, temperature changes, and/or high winds, cause cracks in the adhesive or glues employed and cause eventual roof leaks. As a result, it is difficult for many of the installers to provide guarantees or obtain insurance against water or moisture damage caused by such conventional anchoring systems.

The present invention seeks to overcome this problem by providing a novel anchoring system which avoids such problems in an advantageous and effective manner.

Accordingly, it is an object of the present invention to provide a novel anchor platform assembly for anchoring equipment and/or roof accessory structures to roofs and the like which can accommodate heavy loads and provide waterproof protection at the equipment attachment points.

It is a further object of the present invention to provide such a novel anchor platform assembly which is relatively simple in design and construction, easy to install and is relatively inexpensive to make.

It is a further object of the present invention to provide such a novel anchor platform assembly which can be used for a variety of roof or raised structures, including both flat roofs and pitched roofs, as well as roof decks, outdoor balconies, terraces and the like.

It is a more particular object of the invention to provide such a novel anchor platform assembly which is more reliable than prior art systems in providing a waterproof connection at the equipment attachment points.

It is yet a further object of the present invention to provide such a novel anchor platform which is universally adaptable for anchoring and mounting a multitude and wide variety of roof accessory structures including, inter alia, solar panels, satellite dishes, safety rails, glass railings, HVAC heating and air conditioning equipment, decorative sculptures, holiday ornaments, and the like, etc., while at the same time providing a watertight connection.

SUMMARY OF THE INVENTION

Certain of the foregoing and related objects are achieved according to the present invention by the provision of an anchor platform assembly for anchoring an object to a raised, roof-like structure, which includes an anchor baseplate having a top surface and a bottom surface, and a threaded blind bore extending at least partially from the top surface generally towards the bottom surface, means for fastening an object to the anchor baseplate via the blind bore and means for fastening the anchor baseplate to a roof-like structure.

In a preferred embodiment, the anchor baseplate is rectangular, the blind bore is generally centrally-disposed in the anchor baseplate and the anchor baseplate has a plurality of spaced-apart, ancillary through holes spaced from the blind bore and disposed generally adjacent to the periphery of the anchor baseplate. Most advantageously, the assembly includes a plurality of mechanical fastening members, each receivable through one of the ancillary holes for fastening the anchor baseplate to the roof-like structure and a mechanical fastener threadably receivable in the centrally disposed threaded blind bore for anchoring an object thereto. Preferably, the plurality of mechanical fastening members are screws and the mechanical fastener member receivable in the centrally-disposed threaded blind bore is a threaded bolt.

In a particularly preferred embodiment of the invention, the anchor baseplate additionally includes an elongated post depending from the bottom surface thereof in which the blind bore is at least partially defined, with the post having a top end secured to the bottom surface of the anchor baseplate and a closed bottom end. Desirably, the anchor baseplate post is cylindrical and may optimally be at least partially externally threaded. In the latter case, a nut is receivable on the externally threaded post for securing the anchor platform assembly to the raised roof-like structure from below. Most desirably, the anchor baseplate is made from stainless steel.

In another preferred embodiment of the present invention, the anchor baseplate has a centrally-disposed, non-threaded bore and the post has a reduced diameter neck portion adjacent its top end which is configured and dimensioned for receipt within the centrally-disposed, non-threaded bore.

Preferably, the anchor platform assembly also includes an object support member having a base wall and a bore formed therethrough which is positionable on said anchor baseplate so that the base wall bore is aligned with said threaded blind bore. Advantageously, the assembly further includes an elongated and U-shaped support for an object which has a generally planar base wall, a support stand having a planar base and an upstanding tubular body member joined to the planar base, with the planar base having a throughbore formed therethrough alignable with the blind bore of the anchor baseplate and the tubular body member having opposing sidewalls, each having a throughbore aligned with the throughbore in the opposing sidewall. The assembly also includes an object support member having at least one base wall with a throughbore extending therethrough, means for mechanically fastening the object support member to the support stand via the sidewall throughbores of the support stand and the wall of the object support stand; and means for mechanically fastening the support stand to the anchor baseplate via the throughbore of the base wall thereof and the threaded blind bore of the anchor baseplate.

In another particularly preferred embodiment of the present invention, the anchor baseplate is generally solid and has a generally frusto-pyramidal shape and comprises a generally planar top wall defining the top surface of the anchor baseplate and a generally planar bottom wall defining the bottom surface. Most desirably, the anchor baseplate is generally square-shaped and has four sloping sidewalls extending between the top and bottom walls, and the sidewalls each having a recessed cutout and a throughbore extending from each of the recessed cutouts to the bottom surface of the bottom wall.

Additionally means are provided for mechanically fastening the anchor baseplate to a roof-like structure via the throughbores of the sidewalls.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

FIG. 8b is a plan view of the anchor platform assembly shown in FIG. 8a;

FIG. 8c is a side view of the anchor platform assembly shown in FIG. 8a;

FIG. 8d is an exploded, cross-sectional view of the fourth embodiment of the anchor platform assembly comparable to FIGS. 4b, 5a, and 6a.

DETAILED DESCRIPTION OF THE PREFERRED EMBODIMENTS

Turning now in detail to the drawings and, in particular, to FIGS. 1-4c thereof, therein illustrated is a first embodiment of a novel anchor platform assembly embodying the present invention, generally designed by reference numeral 10, for anchoring roof accessory structures to roofs and other raised, flat and/or pitched structures, such as terraces, balconies, stairs and the like. The main component of the anchor platform assembly is the anchor baseplate, generally designated by reference numeral 11, which preferably is made of stainless steel (but could be made of other metals, such as aluminum, bronze, etc.), and is square or rectangular shaped and has a top surface 12 and a bottom surface 13. The anchor baseplate 11 has an internally-threaded central through bore 14 and six spaced apart peripheral through bores 15 positioned radially outward from the center bore 14 and generally adjacent to the periphery of the baseplate 11. In this embodiment, the anchor baseplate 11 also includes a preferably cylindrical rod or post 16 having an axially-extending, internally-threaded bore 17 (see FIG. 4b) having a top open end 18 and a closed bottom 19 (FIG. 2) which is secured preferably via welding to the anchor baseplate 11 so that the top open end 18 of its bore 17 abuts and is in registry with the bottom open end of center through bore 14 (see FIG. 4*b*).

Figure 1:
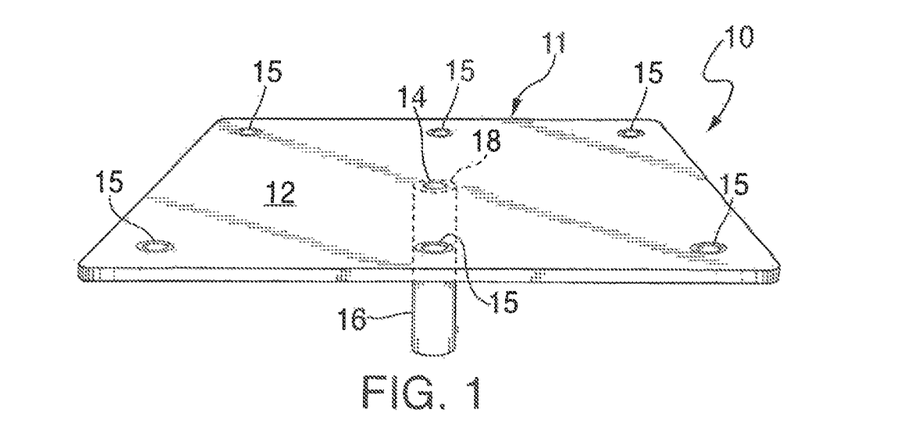
FIG. 1 is a top and side perspective view of a first embodiment of an anchor baseplate utilized in an anchor platform assembly embodying the present invention.
Figure 2:
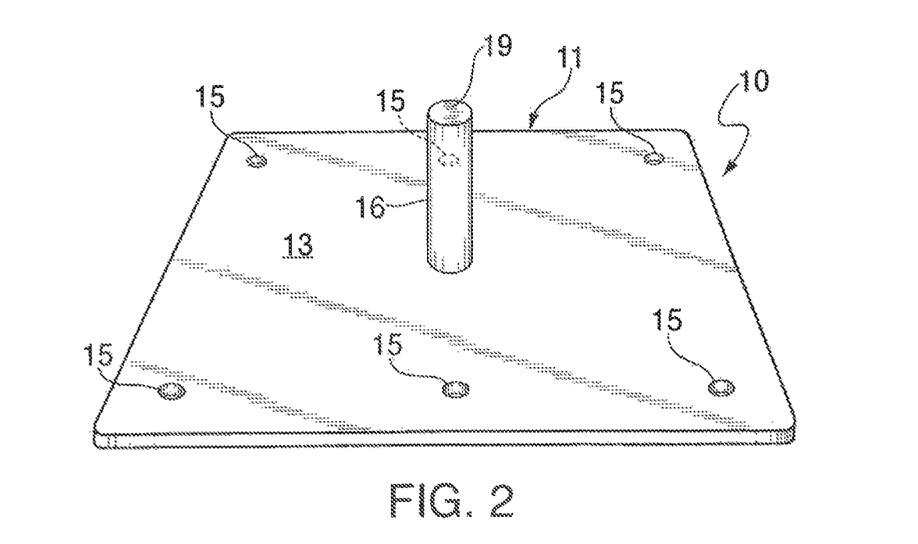
FIG. 2 is a bottom and side perspective view of the anchor baseplate shown in FIG. 1.
Figure 3:
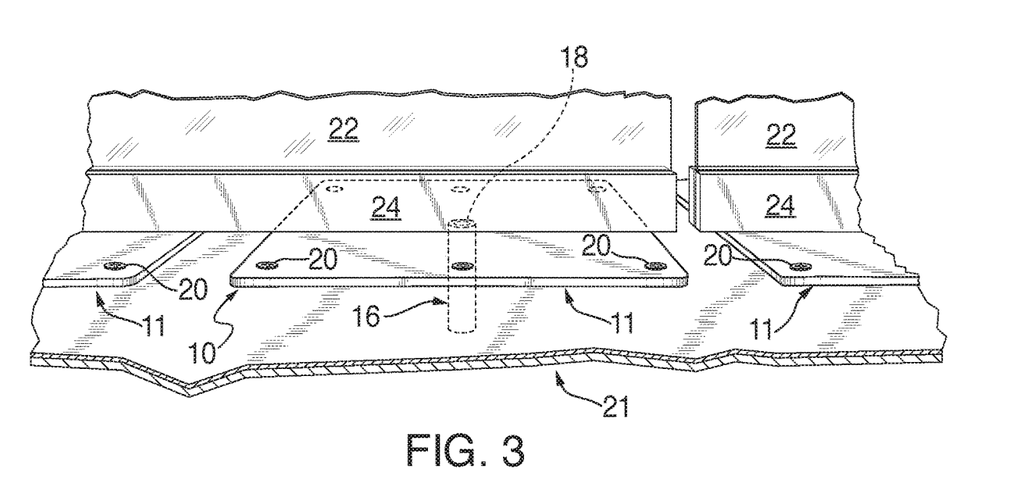
FIG. 3 is fragmentarily-illustrated a perspective view of a first embodiment of the anchor platform assembly embodying the present invention employing a plurality of serially-arranged anchor baseplates mounted on a roof deck and anchoring thereto a plurality of spaced apart elongated rails having U-shaped channel or shoe in which, in turn, is mounted on a pair of glass railings.

As shown in FIG. 3, the anchor baseplate 11 of the anchor platform assembly 10 is typically mounted via mechanical fastening elements 20 preferably in the form of nails or bolts, to a roof structure, such as a roof deck, generally designated 21, with its cylindrical post 16 extending through the roof deck 21 and projecting below the roof deck with its closed end 19. The internally threaded and aligned bores 14 and 17 serves as an anchor point for an object to be mounted on the roof deck 21. In this case, the object is a glass railing of the type that has glass panel 22 with a lower edge secured within an elongated U-shaped metal channel or shoe 24. FIG. 3 specifically depicts three serially arranged and spaced apart anchor baseplates 11 to which two glass panels 22 and two shoes 24 are at least partially mounted. In use, such glass railings can be hundreds of feet in length. As can be appreciated, depending on the length of each glass railing 22, two or more anchor baseplates 11 per glass rail 22 may be required as shown in FIG. 3.

Figure 4A:
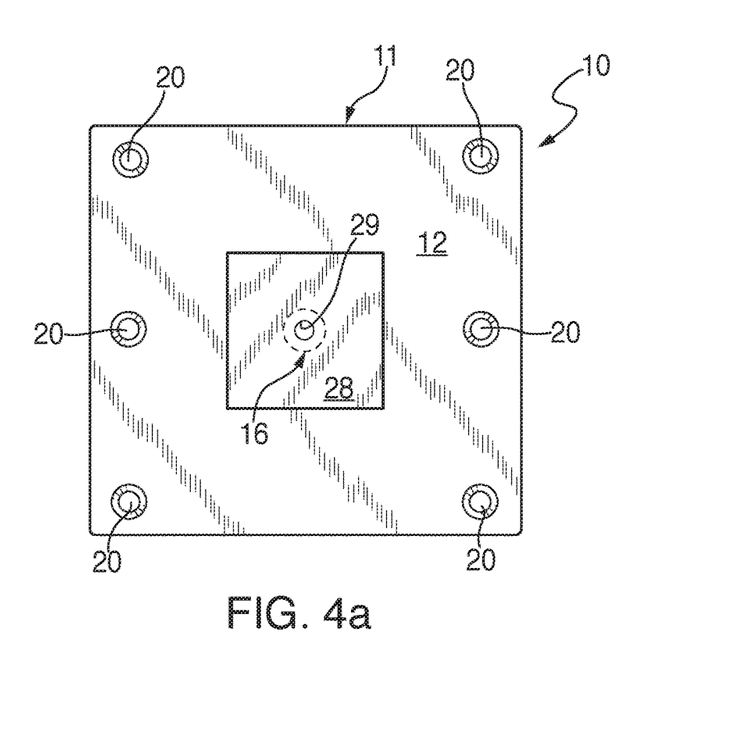
FIG. 4a is a plan view of the anchor baseplate and an optional shim plate centered thereon for adjusting the height of the rail.
Figure 4B:
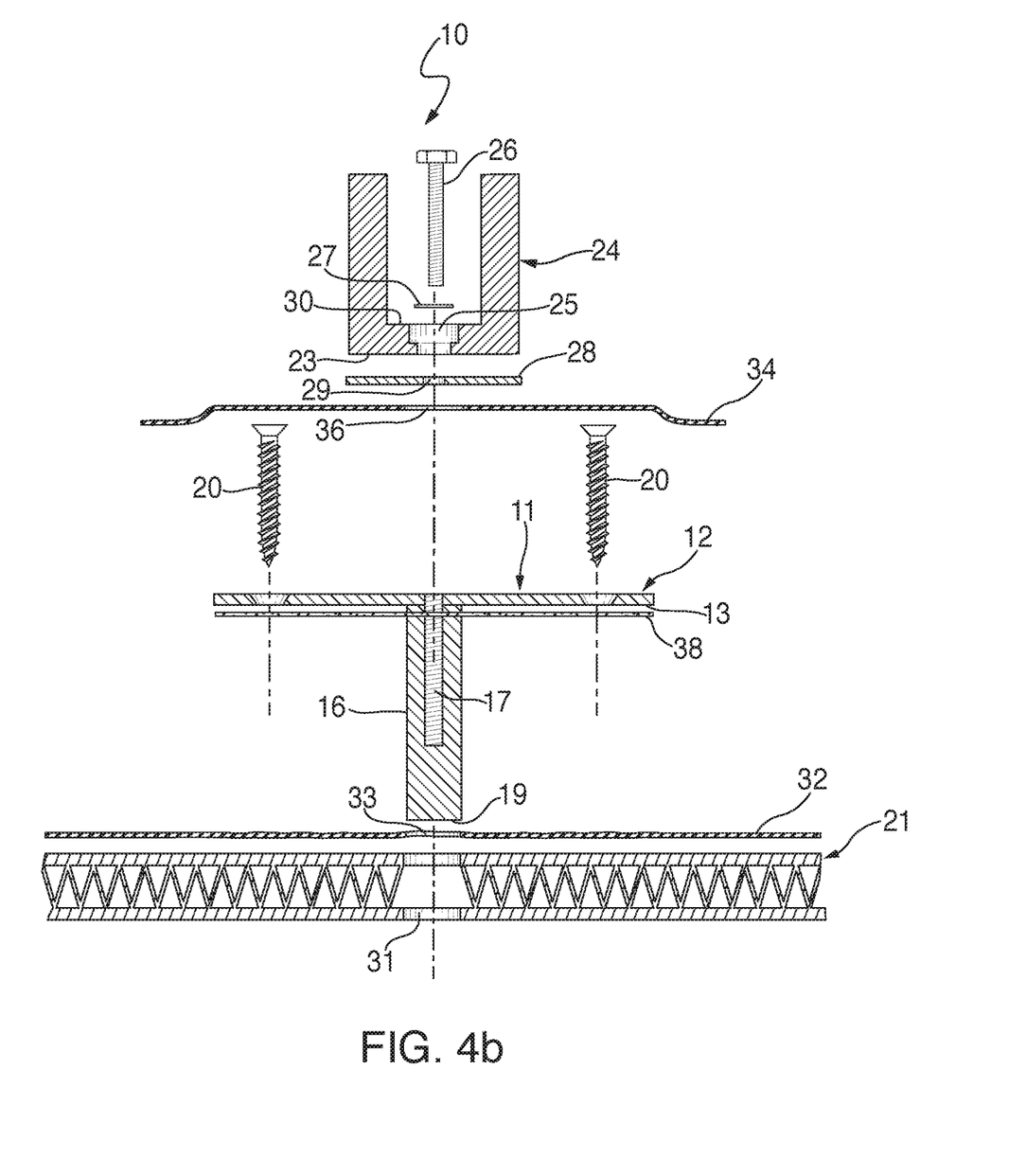
FIG. 4b is an exploded, cross-sectional view of the anchor platform assembly including the anchor baseplate and shim plate shown in FIG. 4a in positional relationship with respect to the U-shaped shoe and the roof deck shown in FIG. 3 and further showing the roof flashing associated therewith including an anchor baseplate membrane and a roof membrane, and the fastening means employed therewith.

As seen best in FIG. 4*b*, the elongated U-shaped shoe 24 has a base wall 23 with a plurality of spaced apart through bores 25 (one of which is shown). As will be discussed in greater detail hereinafter, mechanical fasteners are used, such as a threaded bolt 26 and washer 27, which bolt 26 is receivable through the through bores 25 of the U-shaped shoe 24 and are receivable within the internally-threaded center bore 14 of anchor baseplate 11 and internally-threaded blind bore 17 of the cylindrical post or rod 16 (FIG. 4*b*) to anchor the same to the roof deck 21. The cylindrical post 16 with the closed bottom 19 serves two purposes: (1) it provides a relatively sturdy and rigid anchoring support point for the object to be mounted on the roof, and (2) it prevents water from penetrating via the central bore 14 into and below the roof deck 21 as a result of blind bore 17 and the bottom end 19 of the cylindrical rod 16 being closed.

FIG. 4*a* shows the use of a square-shaped shim plate 28 having a central through bore 29 mounted atop the anchor baseplate 11 such that its central through bore 29 is directly over and in registry with the internal blind bore 17 of the cylindrical post 16. The shim plate 28 is used to adjust the height of the shoe 24 to ensure proper alignment of adjacent shoes 24 and the glass railing(s) 22 they support due to variations in height of the roof deck 21 or the like. Additional shim plates 28 can, of course, be used, if needed, to achieve proper height alignment.

Figure 4C:
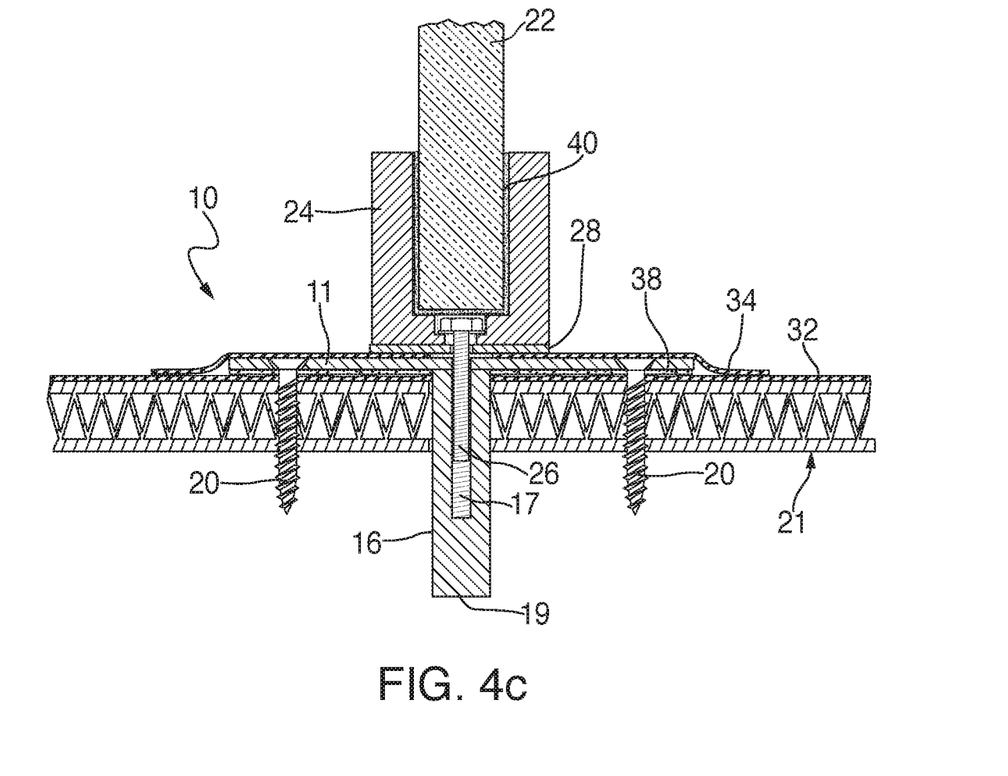
FIG. 4c is a cross-sectional view of the anchor platform assembly shown in FIG. 4b in a fully, mounted state on a roof deck whereby the glass rail is anchored via its U-shaped shoe to the roof, and also showing the use of flashing materials, fasteners and adhesives employed therewith.

As illustrated in FIGS. 4*b* and 4*c*, the central throughbore 25 of the U-shaped channel or shoe 24 contains a step which is dimensioned and configured to receive and support the bolt head of bolt 26 and washer 27 on the step so that the bolt head of bolt 26 is disposed below the top surface 30 of the lower base wall 23 of U-shaped shoe 24 so as not to abut and possibly crack or damage the bottom edge of the glass railing 22.

FIGS. 4*b* and 4*c* respectively show an exploded cross-sectional view and a fully mounted cross-sectional of the anchor platform assembly 10 which include preferred flashing materials, fasteners and adhesives and the like for mounting a glass railing to a roof deck or terrace or the like. As shown in FIG. 4*b*, the anchor baseplate 11 is positioned above the roof deck 21 which may be of wood, metal or composite construction as is standard or conventional in the industry. The cylindrical post 16 of the anchor baseplate 11 is intended to be inserted through a through bore 31 in the roof deck 21 and a conventional rubber roof membrane 32, preferably made of neoprene, which also has a through bore 33 is preferably interposed between the anchor baseplate 11 and roof deck 21. Similarly, a conventional rubber roof membrane 34, also preferably made of neoprene, is preferably positioned between the optional shim plate 28 and the top surface 12 of the anchor baseplate 11 and it too is provided with a central bore 36 to allow the bolt 26 to pass through the membrane 34. In addition, a sealant, cement, caulk or adhesive layer 38 is shown which would normally be applied to the bottom surface 13 of the anchor baseplate 11 to adhesively join and seal the same to the roof membrane 32.

As also shown in FIG. 4*c*, an adhesive, caulk or glue 40 is also applied to the inner surface of the U-shaped channel 24 so that it surrounds the lower end of glass railing 22 received within the U-shaped metal channel 24. As also illustrated therein, the anchor baseplate membrane 34 extends over the entire anchor baseplate 11 with its ends sealed against the roof membrane 32 thereby sealing the screw holes and the remainder of the anchor baseplate 11. As can be appreciated, these flashing materials and adhesives serve to waterproof the assembly and protect the roof from leaks.

As previously mentioned, this is particularly important at the point of attachment of the object to the roof which, in this case, refers to the point of attachment of the glass railing shoe 24 to the anchor baseplate cylindrical post 16 via bolt 26 and the blind threaded bore 17 in which the bolt 26 is received. Since bore 17 is a blind bore or hole and the bottom end 19 of the cylindrical post 16 is closed, the potential path of any water that could conceivably penetrate between the glass panel 22 and the U-shaped channel 24 and enter the bore 17 of the cylindrical post 16 is totally blocked from penetrating the roof deck 21.

Figure 5A:
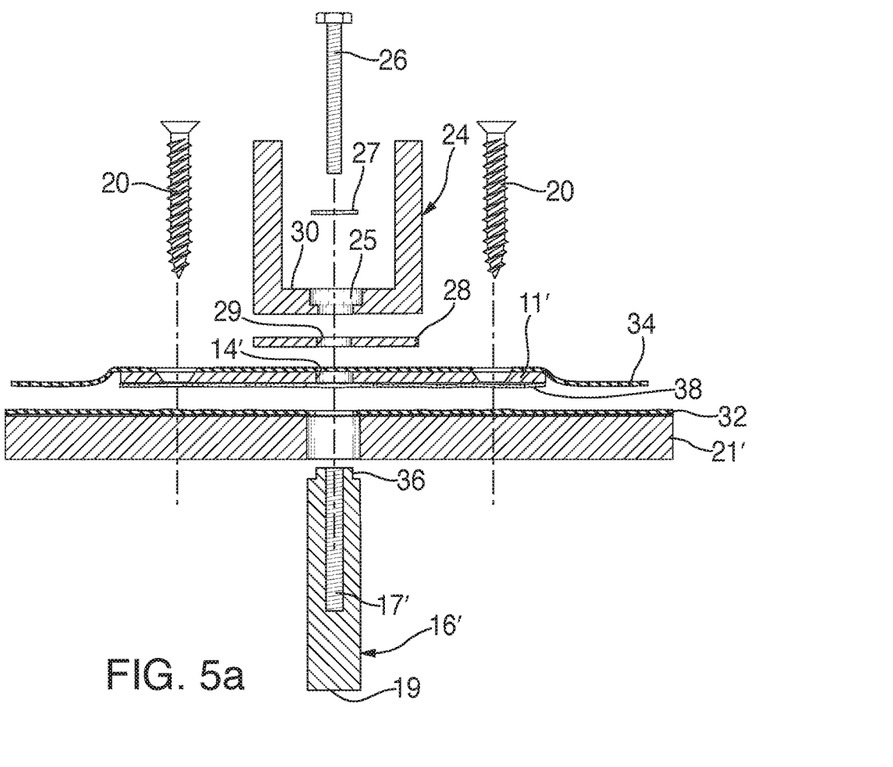
FIG. 5a is an exploded, cross-sectional view of a second embodiment of the anchor platform assembly comparable to FIG. 4b, but showing the anchor baseplate having an internally threaded post with a reduced width neck section.
Figure 5B:
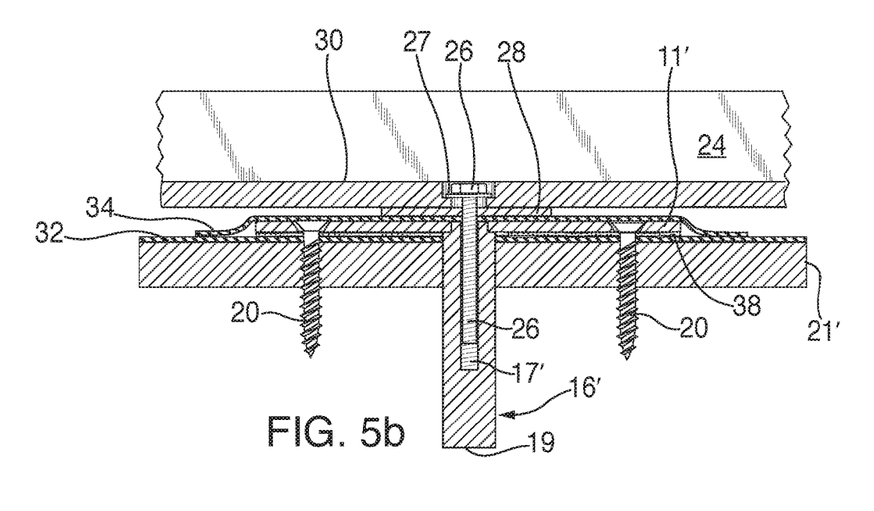
FIG. 5b is a cross-sectional view of the second embodiment of the invention in a fully mounted state, comparable to FIG. 4c, but showing the use of an internally threaded post with a reduced width neck section seated within the central bore of the anchor baseplate.

FIGS. 5*a* and 5*b* illustrate a second embodiment of the anchor baseplate assembly and, in a similar fashion, respectively show an exploded cross-sectional view and a fully mounted cross-sectional view of this second anchor platform assembly embodiment. The elements shown in this second embodiment are the same as shown in FIGS. 4*b* and 4*c* with the exception that the cylindrical post 16' is provided with a narrow neck portion 36 and the baseplate 11' is provided with a non-threaded central bore 14', but both are otherwise identical to the baseplate 11 and cylindrical post 16 shown in the previous embodiment. In FIGS. 4*b* and 4*c* the top end 18 of the cylindrical post 16 would typically be welded to the bottom surface 13 of the anchor baseplate 11. In FIGS. 5*a* and 5*b* however, the narrow neck section 36 is intended to be received within the non-threaded central bore 14' of the anchor baseplate 11' and as a result of this construction, a more robust, and stronger bond can be made due to the fact that when said anchor plate 11' and post 16' are welded together with the respective center bore 14' and internal threaded bore 17' being held in proper alignment by the reduced neck section 36 of the post 16' being received in the center bore 14'.

Figures 6A, 6B:
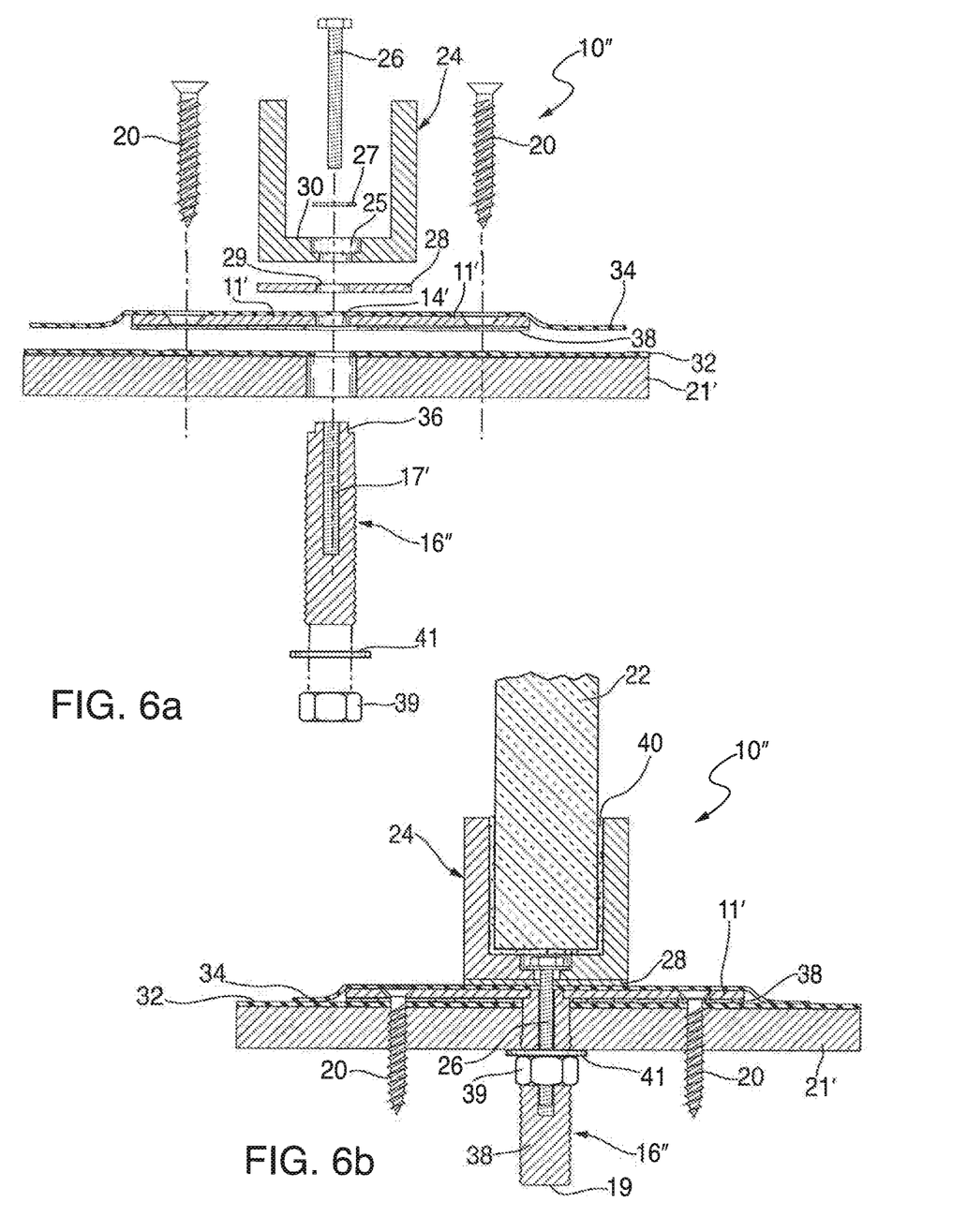
FIG. 6a is an exploded, cross-sectional view of a third embodiment of the anchor platform assembly comparable to that shown in FIGS. 4b and 5a, but showing an anchor baseplate having an externally threaded post.
FIG. 6b is a cross-sectional view of the third embodiment of the anchor platform assembly in a fully mounted state comparable to that of FIGS. 4 and 5b, but showing the externally threaded post securing the anchor baseplate to the roof deck from beneath the roof deck via a nut and a washer.

FIGS. 6*a* and 6*b* illustrate a third embodiment of the anchor baseplate assembly 10" and, in a similar fashion, respectively show an exploded cross-sectional view and a fully mounted cross-sectional view of this third anchor platform assembly embodiment.

The elements shown in this third embodiment are the same as shown in FIGS. 5*a* and 5*b* with the exception that the lower portion 38 of cylindrical post 16" is externally threaded but is otherwise identical to the cylindrical post 16'. In this embodiment, a nut 39 and washer 41 are threaded onto the externally threaded surface 38 of the cylindrical post 16" so that in the fully assembled state shown in FIG.

6b, the nut 39 and washer 41 are tightened against the lower surface of the metal roof deck 21' to provide a stronger point of attachment while at the same time preventing roof leaks at the point of attachment via the blind bore 17' and the closed end 19 of the cylindrical post 16".

Figure 7A:
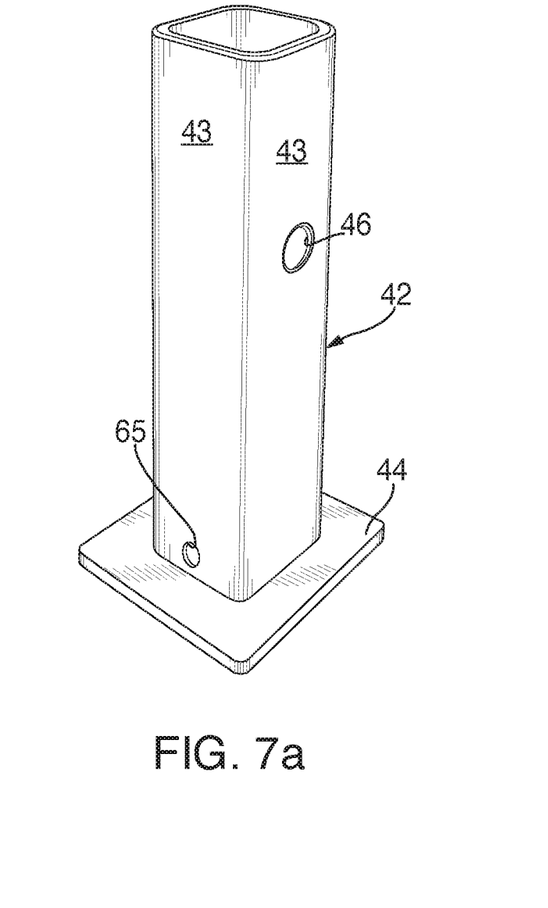
FIG. 7a is a perspective view of an anchor platform assembly accessory unit embodying the present invention for supporting a roof accessory structure in an offset and raised arrangement relative to the anchor base platform and roof deck respectively.
Figure 7B:
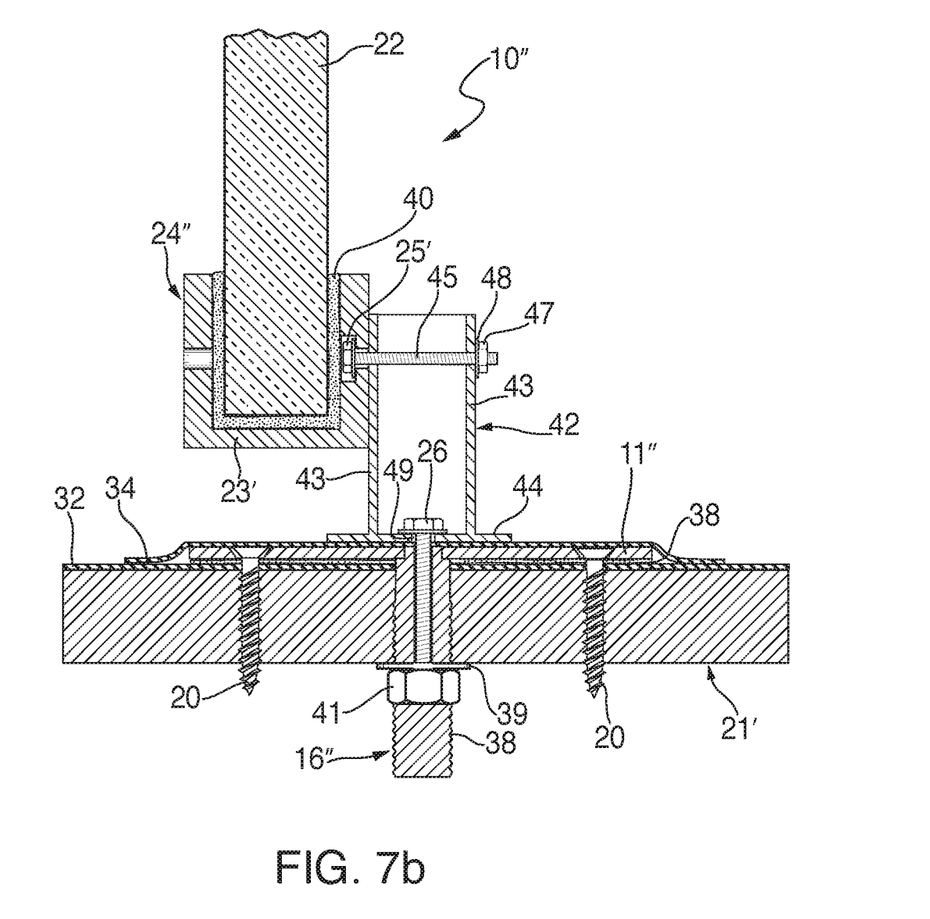
FIG. 7b is a cross sectional view similar to FIG. 6b, but showing the accessory unit supporting the glass railing and its supporting shoe in a raised position spaced above the roof deck and offset from the center hole in the anchor baseplate.

FIGS. 7a and 7b illustrate a novel accessory support stand 42 for the various anchor plate assemblies shown herein which allows the user to support an object in a raised and spaced manner above the anchor baseplate. The accessory support stand 42 comprising a preferably metal, square or rectangular planar base 44 and an upstanding preferably metal square-shaped, tubular body member joined at one end to the planar base 44 by welding. A weep hole 65 is provided at the base of one sidewall 43 to allow water to drain therefrom. The baseplate 44 has a central hole 49 (FIG. 7b) which is alignable with the internally threaded bore 17' of the cylindrical post 16" and the threaded stem of bolt 26 is threadably received within the internally-threaded bore 17' to anchor the support stand 42 to the anchor baseplate 11". At least one set of horizontally aligned holes 46 are formed in opposite side walls 43 of the upstanding tubular body through which a threaded bolt 45 could be mounted to secure an object to one of the sidewalls 43 of the support stand 42 as shown best in FIG. 7b. In this case, the U-shaped channel 24" is provided with a recessed through bore 25' in one of its sidewalls rather than in its base wall 23' as shown in the embodiments of FIGS. 1-6. The bolt 45 is held in the recessed throughbore 25' via its bolt head being held against the step of the channel through bore 25' and at its opposite end by an additional nut 47 and washer 48 to secure the U-shaped channel 24" in a raised and elevated position relative to the anchor baseplate 11" and roof member 21' and offset relative to the center blind bore of the anchor baseplate 11".

Finally, FIGS. 8a-8e disclose a fourth embodiment of the anchor platform assembly 10''' wherein the anchor baseplate 11''' has a lower square-shaped, planar base portion 50 and a frusto-pyramidal upper portion which defines four upwardly tapered sidewalls 51 and a square-shaped planar top wall 52. The top wall 52 has a internally threaded, centrally-disposed blind bore 54 and each of the sidewalls 51 have a recessed, generally cylindrical cutout or cavity 55 which opens onto a throughbore 56 which extends through the bottom portion 50 and in turn, opens on the bottom surface 57 thereof.

Figure 8A:
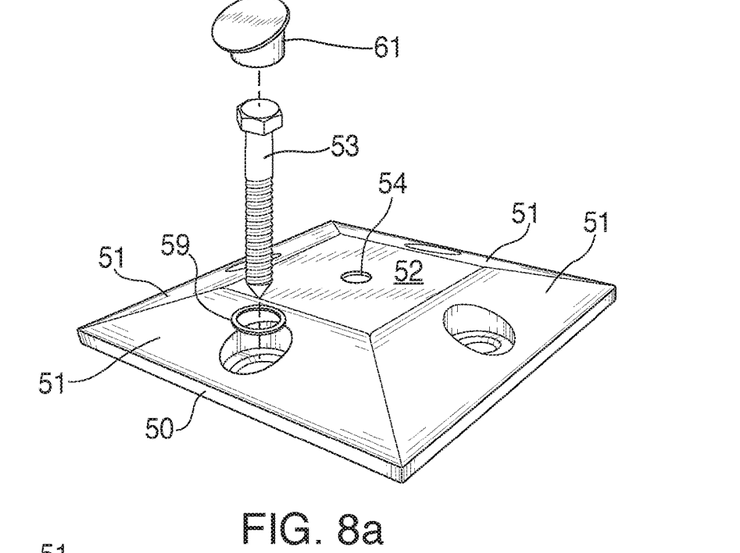
FIG. 8a is a top and side perspective view of a fourth embodiment of the anchor platform assembly embodying the present invention, showing in an exploded view, the employment of a cap lag, bolt and washer associated with one of the recessed throughbore cavities.
Figure 8B:
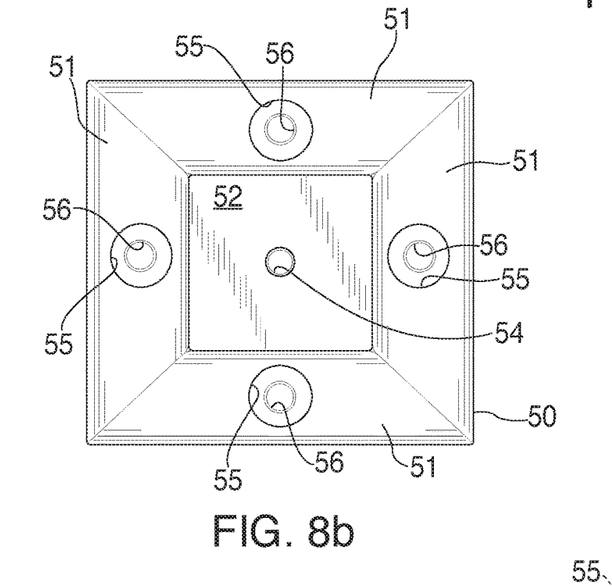
Figure 8C:
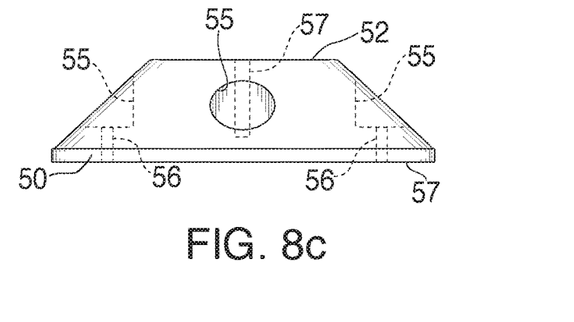
Figure 8D:
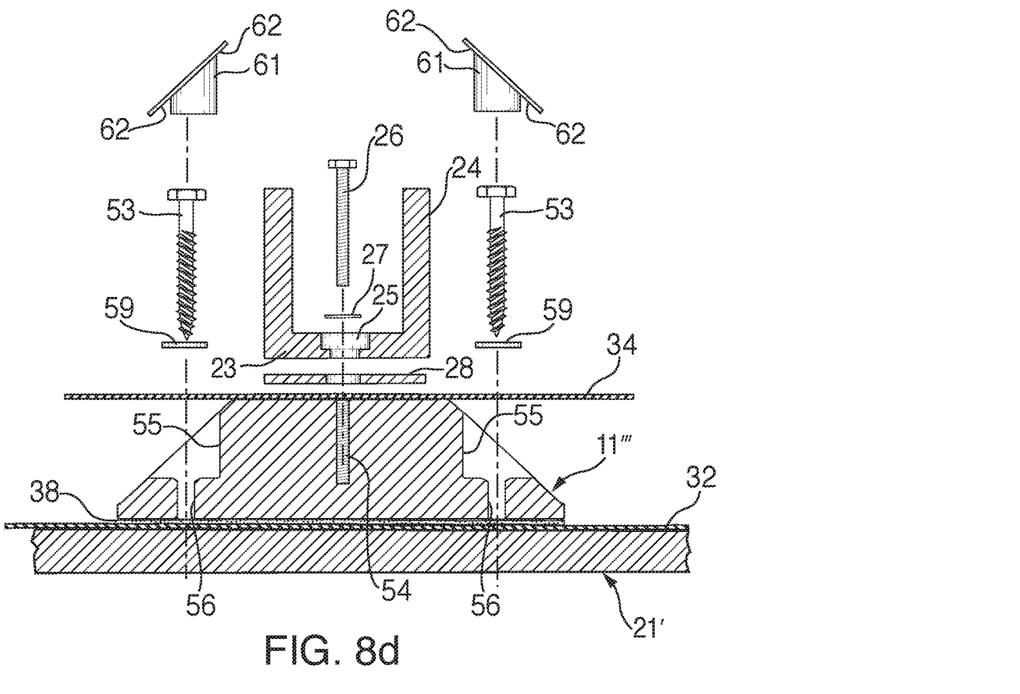
Figure 8E:
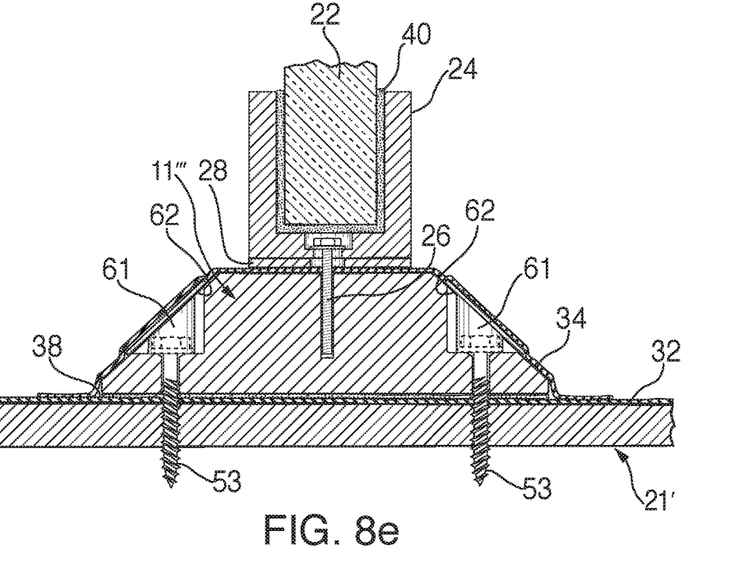
FIG. 8e is a cross-sectional view of the fourth embodiment of the anchor platform assembly in a fully mounted state comparable to that shown in FIGS. 4c, 5b, and 6b, showing anchoring a glass railing to a metal rod and further showing the use of roof flashing materials, fasteners, and adhesives employed therewith.

As seen in FIGS. 8d and 8e which respectively show an exploded cross-sectional view and a fully mounted cross-sectional view of this fourth embodiment of the anchor platform assembly, the top wall 52 is used to anchor an object 24 to the roof structure via its internally threaded central blind bore 54. Lag screws 53 are inserted in each of the sidewall throughbores 55 to affix the anchor baseplate 11''' to the metal roof deck 21'. The sidewall cavities 55 are then covered by generally cup-shaped caps 61 having radially-extending flanges 62 which are intended to close off and seal the cavities 55 and to prevent water infiltration. Like the other embodiments, a roof membrane 32 is deployed between the anchor baseplate 11''' and the metal roof structure 21' and an anchor baseplate membrane 34 is also disposed directly over the anchor baseplate 11''' and its ends extends over the roof deck membrane 32. A bolt 26 and washer 27 is provided which anchors the U-shaped support shoe 24 to the anchor baseplate 11'''. The bolt head of bolt 26 and washer 27 are received on the throughbore step 25 of the basewall 23 and the bolt is threadably received in the threaded blind bore 54 to anchor the anchor baseplate 11''', in turn, to the metal roof deck 21'. An adhesive layer 38 also binds the anchor baseplate 11''' to the roof membrane 32 to improve the waterproofing capability of the assembly.

Obviously, the materials employed, dimensions and sizing of the various parts of the anchor platform assembly can be modified to suit the particular roof application. For example, in the case of mounting a balcony railing, it would be suitable in certain applications to use 6"×6" baseplates, 4⅛" high×2½" wide aluminum shoes with ½" thick glass panels set into the aluminum shoe with anchoring cement.

As can also be appreciated from the foregoing, the shape and the number of anchor baseplates, non-threaded throughbores, threaded blind bores and placement thereof can also be modified depending upon the specific details of the application such as the nature, size and material of the roof structures, such as metal, wood or some other composite. Similarly, it is anticipated that the types of fasteners, membranes flashing materials and sealants will also be chosen to be compatible with the roof structure. Also, the elements of the various embodiments may be substituted for one another where appropriate.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. An anchor platform assembly for anchoring an object of the type having a planar wall with an opening therethrough to a support structure of the type having a planar, wall with an opening therein to with the aid of a mechanical fastener, comprising:

a one-piece anchor comprising an anchor baseplate having a planar top surface and a planar bottom surface with an opening therethrough, an elongated, cylindrical post having a top end portion secured to said anchor baseplate and a bottom end portion projecting below said bottom surface of said baseplate, having a non-externally-threaded outer surface and a closed bottom end, and an at least partially internally-threaded cylindrical blind bore extending from said opening in said top surface of said anchor baseplate into said post;

wherein said at least partially internally-threaded bore of said post serves as means for fastening the object to said anchor baseplate to thereby permit the planar wall of the object and aid planar too wall of said anchor baseplate to be positionable relative to one another so as to permit them to lie closely together and closely adjacent and parallel with one another with their respective openings aligned with one another and said blind bore of said post;

means for fastening said anchor baseplate to the support structure to thereby permit said planar wall of said bottom surface of said anchor baseplate and the planar wall of the support structure to be positionable relative to one another so as to permit them to lie closely together and closely adjacent and parallel with one another with their respective openings aligned with one another and said blind bore of said post, whereby said bottom portion of said post will extend into the opening of the support structure and can be fixed in place with the aid of the fastener; and wherein said means for fastening said anchor baseplate to the support structure pen rises a plurality of spaced-apart, ancillary through holes formed in said anchor baseplate extending from the top surface of said anchor baseplate to said bottom surface thereof.

2. The anchor platform assembly according to claim 1, wherein said anchor baseplate is rectangular, said blind bore is generally centrally-disposed in said anchor baseplate and wherein said plurality of spaced-apart, ancillary through holes are spaced from said blind bore and disposed generally adjacent to the periphery of said anchor baseplate.

3. The anchor platform assembly according to claim 2, wherein said means for fastening said anchor baseplate to a support structure comprises a plurality of mechanical fastening members, each receivable through one of said ancillary holes for fastening said anchor baseplate to the support structure, and wherein said mechanical fastener is threadably receivable in said centrally-disposed, internally-threaded, cylindrical blind bore for anchoring an object thereto and said mechanical fastener comprises an enlarged head and said at least partially threaded cylindrical shaft.

4. The anchor platform assembly according to claim 3, wherein said plurality of mechanical fastening members comprise screws and said mechanical fastener receivable in said centrally-disposed threaded blind bore is a threaded bolt.

5. The anchor platform assembly according to claim 1, additionally comprising said object, said object comprising an object support member having a base wall and an opening extending therethrough.

6. The anchor platform assembly according to claim 5 wherein said object support member comprises an elongated and U-shaped support which includes said planar base wall and said opening extending therethrough.

7. The anchor platform assembly according to claim 6, additionally comprising a support stand having a planar base and an upstanding tubular body member joined to said planar base, said planar base having a throughbore formed therethrough alignable with said blind bore of said anchor baseplate and said tubular body member having opposing sidewalls, each having a throughbore aligned with the throughbore in the opposing sidewall;

wherein said U-shaped object support member has a pair of sidewalls, each of which has a throughbore extending therethrough;

means for mechanically fastening said object support member to said support stand via said sidewall throughbores of said support stand and one of said sidewalls of said object support member; and means for mechanically fastening said support stand to said anchor baseplate via said throughbore of said planar base thereof and said blind bore of said anchor baseplate.

8. The anchor platform assembly according to claim 1, wherein said anchor baseplate opening has a non-threaded throughbore.

9. The anchor platform assembly according to claim 8, wherein said top end portion of said post is disposed within said non-threaded throughbore of said anchor baseplate.

10. The anchor platform assembly according to claim 1, wherein said top surface and said bottom surface of said anchor baseplate are substantially flat so that the object may lie flush against said top surface and the bottom surface may lie flush against the support structure except for the portion of the bottom surface covered by said post.

11. The anchor platform assembly according to claim 4, wherein said anchor baseplate, said post, said screws and said bolt are made of metal.

12. The anchor platform assembly according to claim 1, wherein said post of said anchor baseplate has a smooth outer surface.

13. The anchor platform assembly according to claim 1, wherein said anchor baseplate and said post are welded together.

14. The anchor platform assembly according to claim 2, wherein said anchor baseplate has a solid core except for portions thereof defining said blind bore and said ancillary through holes.

15. The anchor platform assembly according to claim 1, wherein said top surface and said bottom surface of said anchor baseplate are parallel to one another.

* * * * *